US012556818B2

United States Patent
Fortin-Deschenes et al.

(10) Patent No.: US 12,556,818 B2
(45) Date of Patent: Feb. 17, 2026

(54) VIDEO IMAGE STABILIZATION VIA CAMERA MOVEMENT

(71) Applicant: Apple Inc., Cupertino, CA (US)

(72) Inventors: Simon Fortin-Deschenes, Santa Clara, CA (US); Anthony Ghannoum, Montreal (CA)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 18/579,643

(22) PCT Filed: Jul. 25, 2022

(86) PCT No.: PCT/US2022/038123
§ 371 (c)(1),
(2) Date: Jan. 16, 2024

(87) PCT Pub. No.: WO2023/009406
PCT Pub. Date: Feb. 2, 2023

(65) Prior Publication Data
US 2024/0340537 A1  Oct. 10, 2024

Related U.S. Application Data

(60) Provisional application No. 63/226,388, filed on Jul. 28, 2021.

(51) Int. Cl.
*H04N 23/68* (2023.01)
(52) U.S. Cl.
CPC ....... *H04N 23/687* (2023.01); *H04N 23/6812* (2023.01)

(58) Field of Classification Search
CPC . H04N 23/687; H04N 23/6812; H04N 23/685
See application file for complete search history.

(56) References Cited

U.S. PATENT DOCUMENTS 7,639,934 B2 * 12/2009 Ziemkowski ........ H04N 23/687
348/208.99
8,736,692 B1  5/2014 Wong et al.
9,232,138 B1 * 1/2016 Baldwin .............. H04N 23/682
(Continued)

FOREIGN PATENT DOCUMENTS

WO  WO-2023279275 A1 *  1/2023  ......... H04N 23/6812

OTHER PUBLICATIONS

European Patent Office (ISA/EP), International Search Report and Written Opinion, International Application No. PCT/US2022/038123, 9 pages, Oct. 26, 2022.

*Primary Examiner* — Padma Haliyur
(74) *Attorney, Agent, or Firm* — Thompson Hine LLP

(57) ABSTRACT

Various implementations disclosed herein reduce or eliminate camera motion blur during video capture by moving camera components to compensate for the motion. This may involve, for example, moving a camera component during each frame exposure to compensate for the motion (i.e., during image stabilization periods) and moving the camera component back in the other direction between the frame exposures (i.e., during re-initialization periods). The blur reduction techniques disclosed herein may be used in a live feed video environment in which one or more electronic devices simultaneously capture video via camera components and display the video as a live feed on a display.

20 Claims, 5 Drawing Sheets

(56) References Cited

U.S. PATENT DOCUMENTS

| | | | |
|---|---|---|---|
| 10,848,676 B2 | 11/2020 | Murashima et al. | |
| 2008/0002957 A1* | 1/2008 | Ziemkowski | H04N 23/68 |
| | | | 348/E5.046 |
| 2014/0140684 A1 | 5/2014 | Imanishi | |
| 2017/0006217 A1 | 1/2017 | Ding | |
| 2017/0289454 A1* | 10/2017 | Pettersson | H04N 23/687 |
| 2019/0182424 A1* | 6/2019 | Omari | H04N 23/685 |
| 2019/0258058 A1* | 8/2019 | Fortin-Deschênes | |
| | | | G02B 27/017 |
| 2020/0007770 A1 | 1/2020 | Shi et al. | |
| 2020/0137308 A1 | 4/2020 | Kulik et al. | |
| 2020/0137309 A1 | 4/2020 | Kulik et al. | |
| 2020/0288060 A1 | 9/2020 | Grenet | |
| 2021/0099632 A1* | 4/2021 | Molholm | G06T 15/506 |
| 2023/0164437 A1* | 5/2023 | Goldenberg | H04N 23/6812 |
| | | | 348/169 |
| 2023/0412924 A1* | 12/2023 | Song | H04N 23/6812 |
| 2024/0242358 A1* | 7/2024 | Feng | H04N 23/73 |

* cited by examiner

VIDEO IMAGE STABILIZATION VIA CAMERA MOVEMENT

TECHNICAL FIELD

The present disclosure generally relates to reducing blur in video images and to systems, methods, and devices that adjust camera portions to reduce blur.

BACKGROUND

Movement of electronic devices while capturing video can result in blurriness, i.e., camera-motion blur. For example, as an electronic device is rotated from left to right or vice versa during video capture, the video images may include horizontally-blurred content. One solution to reducing such camera-motion blur is to reduce the recording device's exposure time. However, such reduction in exposure time may reduce video quality, for example, by reducing brightness or introducing noise.

SUMMARY

Various implementations disclosed herein reduce or eliminate camera motion blur during video capture by moving camera portions to compensate for the motion. This may involve, for example, moving a camera component during each frame exposure to compensate for the motion (i.e., during image stabilization periods) and moving the camera component back in the other direction between the frame exposures (i.e., during re-initialization periods). The blur reduction techniques disclosed herein may be used in a live feed video environment in which one or more electronic devices simultaneously capture video via camera components and display the video as a live feed on a display. For example, a mobile device may simultaneously capture images and display the images on a display to provide an augmented reality environment. In another example, a head mounted device (HMD) may simultaneously capture video via one or more outward facing cameras and display the video via one or more displays to create an illusion that a user is viewing the physical environment directly. The rotations/panning of such devices while capturing and/or displaying the videos may be compensated for according to the techniques disclosed herein to reduce or eliminate camera motion blur.

In one exemplary implementation, a processor executes instructions stored in a computer-readable medium to perform a method. The method detects movement (e.g., rotation, panning, etc.) of an electronic device using a sensor (e.g., an IMU or gyroscope) while capturing video via a camera portion (e.g., an image sensor and/or imaging optics). The method moves the camera portion (e.g., using an actuator) from an initial position to a second position to compensate for the detected movement during an exposure period of a frame of the video. In some implementations, such image stabilization is performed during each frame's exposure to offset movement occurring during that exposure. The method also moves the portion of the camera from the second position to the initial position during a non-exposure period following the exposure period of the frame and prior to an exposure period of a subsequent frame. In some implementations, such re-initialization of the camera portion follows each frame exposure as may be needed to return the portion of the camera to a position from which subsequent image stabilization movements may be performed. Moving one or more imagining components according to one or more of the techniques disclosed herein may compensate for motion of an electronic device during video capture. The techniques may reduce blur without requiring a reduction in video quality or brightness and without introducing noise.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory, computer-readable storage medium stores instructions, which, when executed by one or more processors of a device, cause the device to perform or cause performance of any of the methods described herein. In accordance with some implementations, a device includes one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
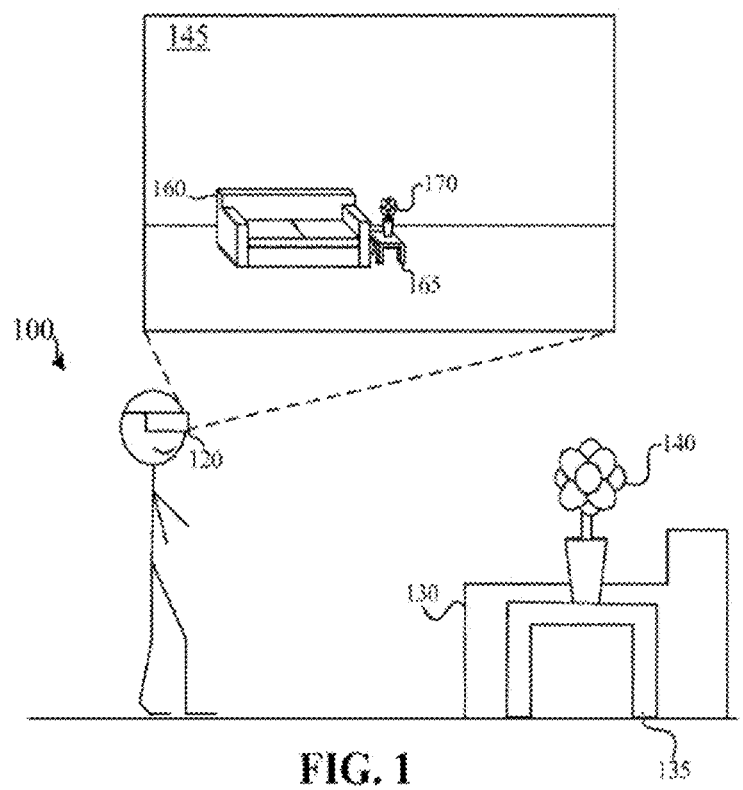
FIG. 1 illustrates an example of an electronic device used within a physical environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example of an electronic device 120 used by a user within a physical environment 100. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell. In FIG. 1, the physical environment 100 includes a sofa 130, a table 135, and a vase with flowers 140.

In the example of FIG. 1, the electronic device 120 is illustrated as a single device. In some implementations, the electronic device 120 is worn by a user. For example, the electronic device 120 may be a head-mounted device (HMD) as illustrated in FIG. 1. Some implementations of the electronic device 120 are hand-held. For example, the electronic device 120 may be a mobile phone, a tablet, a laptop, and so forth. In some implementations, functions of the electronic device 120 are accomplished via two or more devices, for example, additionally including an optional base station. Other examples include a laptop, desktop, server, or other such devices that includes additional capabilities in terms of power, CPU capabilities, GPU capabilities, storage capabilities, memory capabilities, and the like. The multiple devices that may be used to accomplish the functions of the electronic device 120 may communicate with one another via wired or wireless communications.

Electronic device 120 captures and displays video of the physical environment 100. In this example, a first frame 145 of the video is captured and displayed at the electronic device 120. The first frame 145 may be captured and displayed in a serial manner (e.g., as part of a sequence of captured frames in the same order in which the frames were captured). In some implementations the first frame 145 is displayed simultaneously with the capture. In some implementations, the first frame 145 is displayed after a latency period. The first frame 145 includes a depiction 160 of the sofa 130, a depiction 165 of the table 135, and a depiction 170 of the vase with flowers 140. Because the electronic device 120 is stationary, e.g., not rotating/panning, the depictions 160, 165, 170 are clear.

Figure 2:
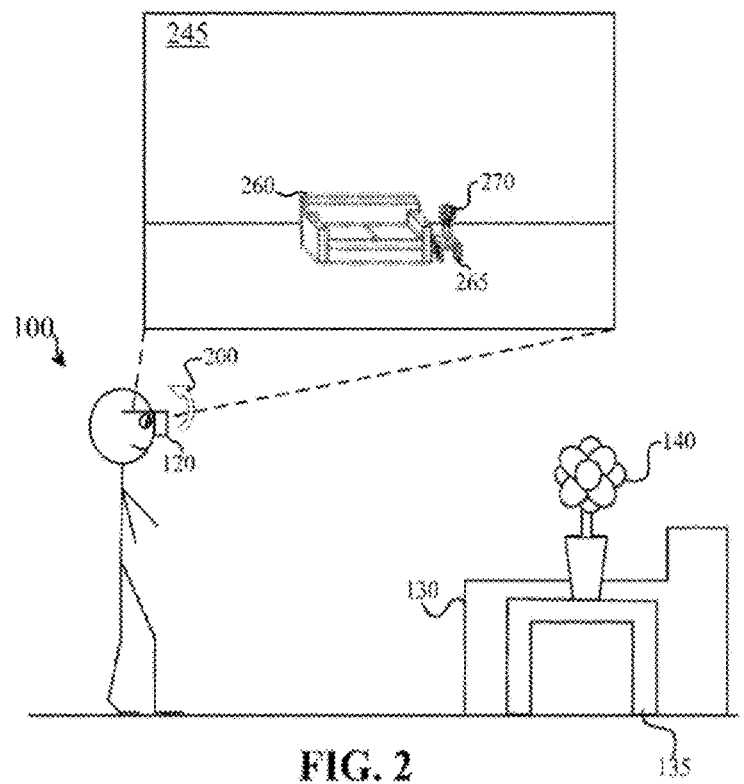
FIG. 2 illustrates an example of the electronic device moving while acquiring video in the physical environment of FIG. 1.

In contrast, FIG. 2 illustrates an example of the electronic device 120 moving (e.g., panning in a direction shown by arrow 200) while acquiring video in the physical environment 100. In this example, a second frame 245 of the video is captured and displayed at the electronic device 120. The second frame 245 may be captured and displayed in a serial manner (e.g., as part of a sequence of captured frames in the same order in which the frames were captured). In some implementations the second frame 245 is displayed simultaneously with the capture. In some implementations, the second frame 245 is displayed after a latency period. The second frame 245 includes a depiction 260 of the sofa 130, a depiction 265 of the table 135, and a depiction 270 of the vase with flowers 140. Because the electronic device 120 is moving, e.g., rotating/panning, the depictions 260, 265, 270 appear blurry.

Figure 3:
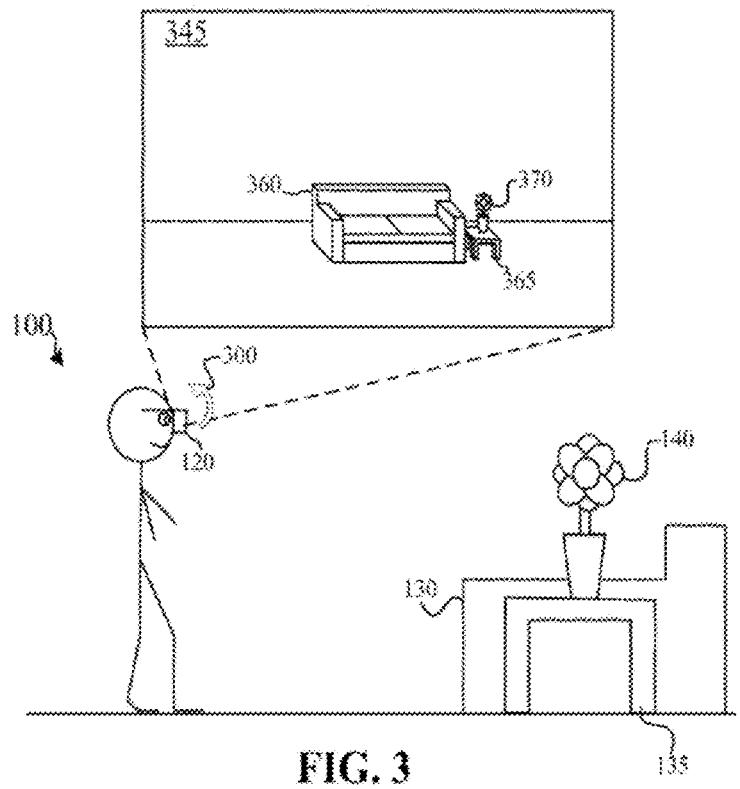
FIG. 3 illustrates an example of the electronic device compensating for movement while moving while acquiring video in the physical environment of FIG. 1 in accordance with some implementations.

Some implementations disclosed herein reduce or eliminate such motion capture blur by moving camera portions to compensate for the motion. FIG. 3 illustrates an example of the electronic device 120 moving (e.g., panning as shown by arrow 300) while acquiring video in the physical environment 100, where the electronic device compensates for the motion. In this example, a third frame 345 of the video is captured and displayed at the electronic device 120. The third frame 345 may be captured and displayed in a serial manner (e.g., as part of a sequence of captured frames in the same order in which the frames were captured). In some implementations the third frame 345 is displayed simultaneously with the capture. In some implementations, the third frame 345 is displayed after a latency period. The third frame 345 includes a depiction 360 of the sofa 130, a depiction 365 of the table 135, and a depiction 370 of the vase with flowers 140. Because the electronic device 120 compensates for the movement, e.g., rotating/panning, of the electronic device 120 during the capturing of the third frame 345, the depictions 360, 365, 370 appear less blurry than the depictions 260, 265, 270 of FIG. 2.

Figure 4:
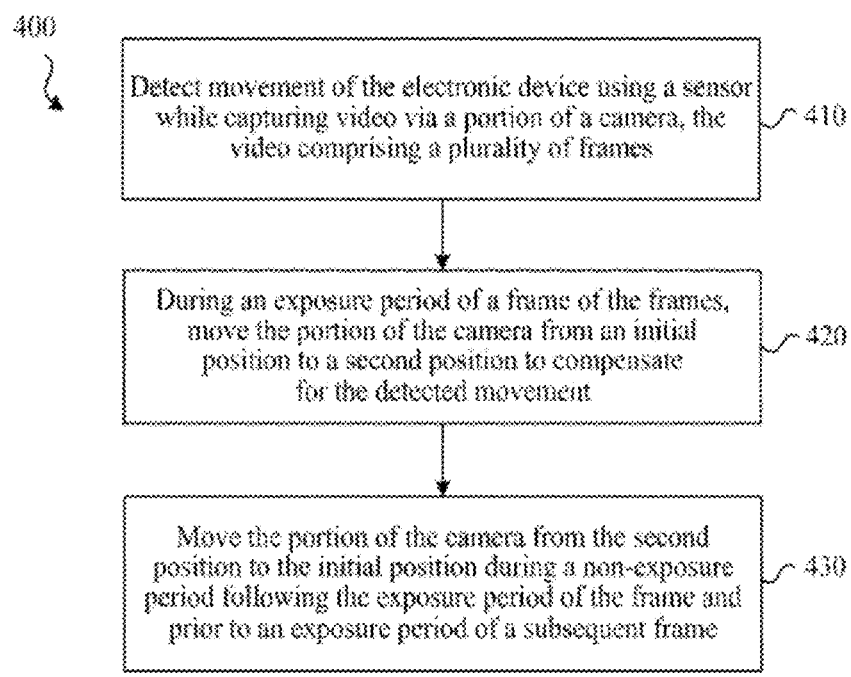
FIG. 4 is a flowchart illustrating an exemplary method of reducing camera motion blur during video capture by moving camera portions to compensate for the motion in accordance with some implementations.

FIG. 4 is a flowchart illustrating an exemplary method 400 of reducing camera motion blur during video capture by moving camera portions to compensate for the motion. In some implementations, the method 400 is performed by a device (e.g., electronic device 120 of FIG. 1). The method 400 can be performed using an electronic device or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 410, the method 400 detects movement (e.g., rotation, panning, etc.) of the electronic device using a sensor while capturing video via a camera. The video includes multiple frames and the changes in device orientation may be detected during the time period in which the multiple frames are captured. In some examples, a sensor such as a gyroscope or inertial measurement unit (IMU) is used to track or otherwise determine the motion of the electronic device. In some cases, the device current motion, e.g., for one or more frames, is used to predict the continued motion of the device, e.g., for the next one or more frames. In some implementations, position encoders/sensors (e.g., Hall sensors, capacitive sensors, optical encoder, magnetic encoder, etc.) are used. In some implementations, movement of the electronic device is detected based on image data from one or more of the images of the video or from one or more images from another image sensor on the electronic device.

At block 420, during an exposure period of a frame of the frames, the method 400 moves a portion of the camera from an initial position to a second position to compensate for the detected movement. The speed of the movement of the portion of the camera may correspond to and thus counteract/offset the effect of movement of the electronic device during the exposure period of the frame.

In a multi-frame video, such image stabilization may be performed during each of multiple frames during a movement of the electronic device. Thus, during each frame's exposure period, the portion of the camera may be moved to offset the corresponding movement of the electronic device.

In some implementations, moving the portion of the camera from initial position to the second position comprises a lateral shift and/or a rotation (e.g., tilt) of an image sensor and/or of optics such as a lens barrel. The portion of the camera may be moved via one or more linear actuators.

The portion of the camera movement may involve use of one or more voice coil motors (VCM), comb drives, micro-electro-mechanical systems (MEMS), adaptive liquid lenses (LL), shape memory alloys (SMA), piezo-electric motors, or the like. The portion of the camera may be moved via a digital signal processor (DSP).

In some implementations, the movement of the portion of the camera is linear in a direction corresponding to the primary direction of movement of the electronic device. For example, if the electronic device is rotated horizontally from left to right, the movement of the portion of the camera may have a corresponding/offsetting horizontal movement. The motion of the portion of the camera required for stabilization can be derived from the output of the motion sensor (e.g., IMU, etc.) The extrinsics between the camera and the motion sensor may be calibrated and may be used to determine the amplitude and velocity of the stabilizing optical component. The motion may be determined by approximating the camera motion as pure rotation and applying inverse tilt to the lens barrel. Alternatively, a pinhole camera approximation can be used, using the camera focal length that may be calibrated to determine the required image sensor motion. It may also be possible to detect a movement (e.g., a 6 degree of freedom movement) of the camera using SLAM, VIO, or an extended tracking system and use a depth map generated by the system to approximately compensate for translational motion with a best fit rotation of the camera/translation of the image sensor.

At block 430, the method 400 moves the portion of the camera from the second position to the initial position during a non-exposure period following the exposure period of the frame and prior to an exposure period of a subsequent frame. Thus, while the portion of the cameras are not capturing a frame, the portion of the camera is moved back to its initial position and is thus ready for stabilization in a subsequent frame. In a multi-frame video, such re-initializations may be performed between each of multiple frames during a movement of the electronic device. Thus, during each frame's exposure period, the portion of the camera may be moved to offset the corresponding movement of the electronic device and then may be moved back to its initial position following the respective exposure period. In some implementations, the method 400 alternates image stabilization periods during which the portion of the camera is moved to compensate for detected movement of the electronic device and re-initialization periods during which the portion of the camera is returned to the initial position.

In some implementations, method 400 selectively provides image stabilization during frame exposure periods, where image stabilization is disabled during a second exposure period based on determining that the movement corresponds to tracking of a moving object in the physical environment. For example, if the user is moving the electronic device to track an object such as a dog running or car moving, image stabilization may be disabled. This may result in the moving object appearing clear and the background content having some blur. However, if the user is gazing at the moving object, e.g., the dog or car, this may provide a desirable and/or otherwise natural viewing experience. The user's gaze, in some implementations, is tracked based on sensor data from one or more sensors capturing images and/or other sensor data about the user's gaze. In some implementations, the device motion and the user's gaze tracking are processed by an algorithm to determine if the user is tracking a moving object. In some implementations, whether image stabilization is provided or not provided is based on determining whether the user is looking at a moving object or not.

In some implementations, image stabilization is adjusted (e.g., sensor/optics displacement is scaled) based on distortion. Distortion dependent video stabilization may be based on the distortion in the camera system corresponding to the area gazed at on the display. For example, if the user is gazing at a pixel (xd,yd) on the display, the color at that display location may be sampled from the camera at px (xc,yc) and so the distortion of the camera at px (xc,yc) may be considered to adjust the video stabilization correction.

Figure 5:
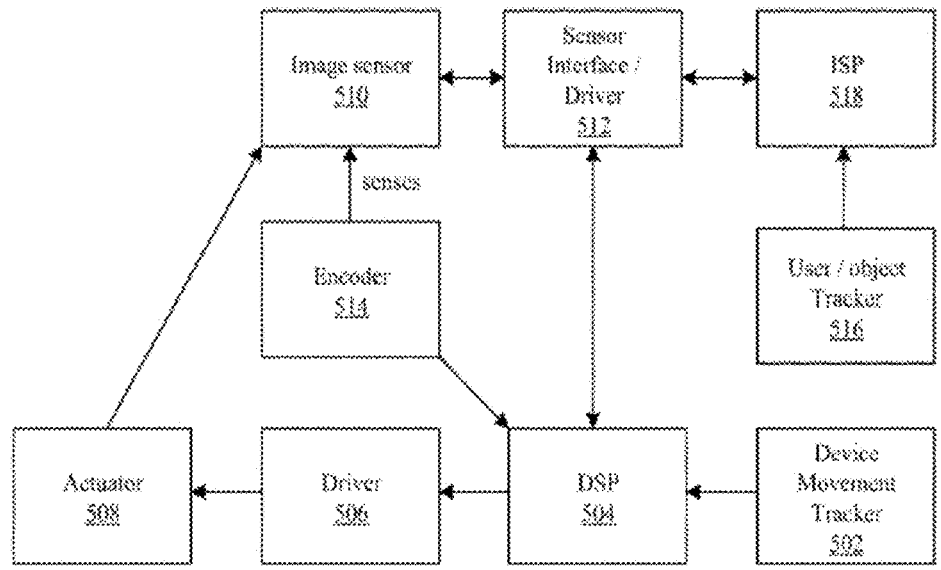
FIG. 5 is a system flow diagram illustrating an exemplary method of reducing camera motion blur during video capture by moving camera portions to compensate for the motion in accordance with some implementations.

FIG. 5 is a system flow diagram illustrating an exemplary method of reducing camera motion blur during video capture by moving portion of the cameras to compensate for the motion. In this example, device movement tracker 502 tracks movement of an electronic device that includes one or more portion of the cameras. Detected movements are provided to digital signal processor (DSP) 504, which controls driver 506 to move actuator 508 to move image sensor 510 to compensate for the detected movements. The DSP 504 may be a subsystem of a general-purpose compute block containing other components, e.g., a CPU, GPU, ANE, or be part of a system on a chip (SOC) architecture and those compute resources may additionally or alternatively be used to determine sensor motion. Encoder 514 encodes the image sensor information (e.g., exposure periods) and provides information about the image sensor movements to the DSP 504. The DSP uses this image sensor information in controlling the image sensor movements, e.g., to provide image stabilization movements during exposure periods and re-initializations between exposure periods. In doing so, the DSP communicates with the sensor interface/driver 512. The user/object tracker 516 may track content of the video (e.g., tracking moving depictions of objects such as dogs and cars) and/or track a user's gaze (e.g., to determine when the user is looking at a moving object or a particular portion of a display). The image signal processor (ISP) 518 may process the images (e.g., the video frames) and/or user/object tracking information and provide information to the sensor interface/driver 512 and/or DSP for use in selectively providing image stabilization in appropriate circumstances.

Some implementations disclosed herein involve a process. The process may use an image sensor and imaging optics (and/or a driver) to capture images. The system may use an optical image stabilization (OIS) system that may provide sensor shift, barrel shift, barrel tilt, etc. and include actuators (e.g., voice coil motor (VCM), comb drive micro-electro-mechanical system (MEMS), adaptive liquid lens (LL), shape memory alloy (SMA), piezo-electric motor, etc.), driver, gyroscope/IMU and position encoders/sensors (Hall sensor, capacitive sensor, optical encoder, magnetic encoder, etc.) and digital signal processor (DSP). The process may use a control-loop that enables the OIS system and image sensor to be operated synchronously. The process may include an operation mode that alternates image stabilization periods and reinitialization periods, during which the OIS system, respectively, compensate for motion blur and moves back to its nominal position. The process may optionally include user/object tracking detection software that detects if the user is tracking a moving object with their gaze and/or head. The OIS system may turn on a no-stabilization mode based on detecting a user tracking an object to enhance the quality of the tracked object in the video. The process may involve an optional correction for camera lens distortion based on eye tracking. For example, an eye tracking system may be used to determine which area on the image is being gazed at by the user and the OIS system may scale the sensor displacement (or barrel shift, barrel tilt, etc.) based on the amount of distortion in that region so that the foveal image is as sharp as possible.

Figure 6:
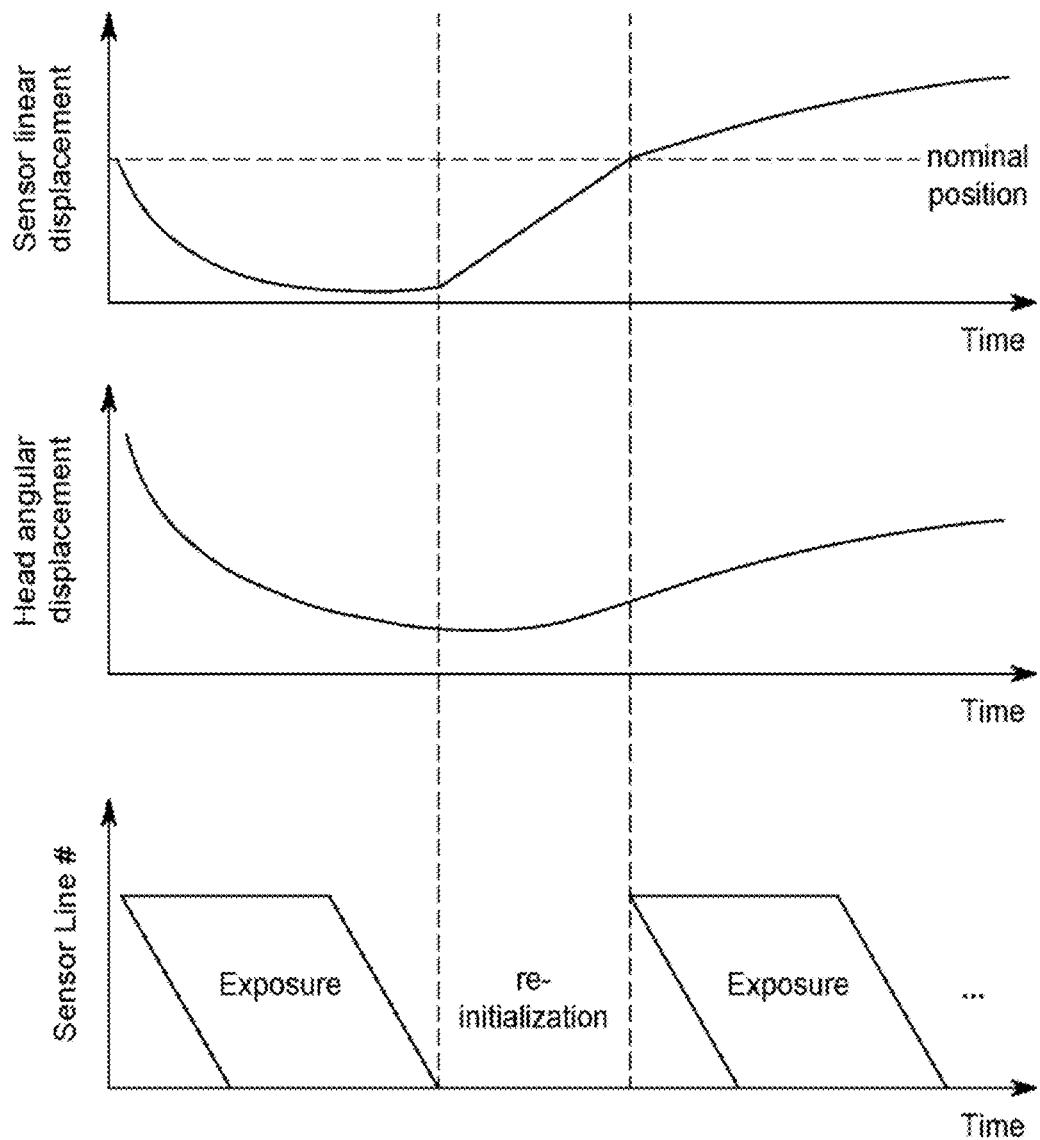
FIG. 6 illustrates alternation of image stabilization periods and re-initialization periods for a rolling shutter sensor.

FIG. 6 illustrates alternation of image stabilization periods and re-initialization periods for a rolling shutter sensor. In the case of a rolling shutter sensor, the OIS system stabilizes motion during the exposure of all the lines and there should be a temporal gap long enough between the end of the exposure of the last line and the next frame exposure of the next frame to allow the stabilization component to move back to its nominal position.

Figure 7:
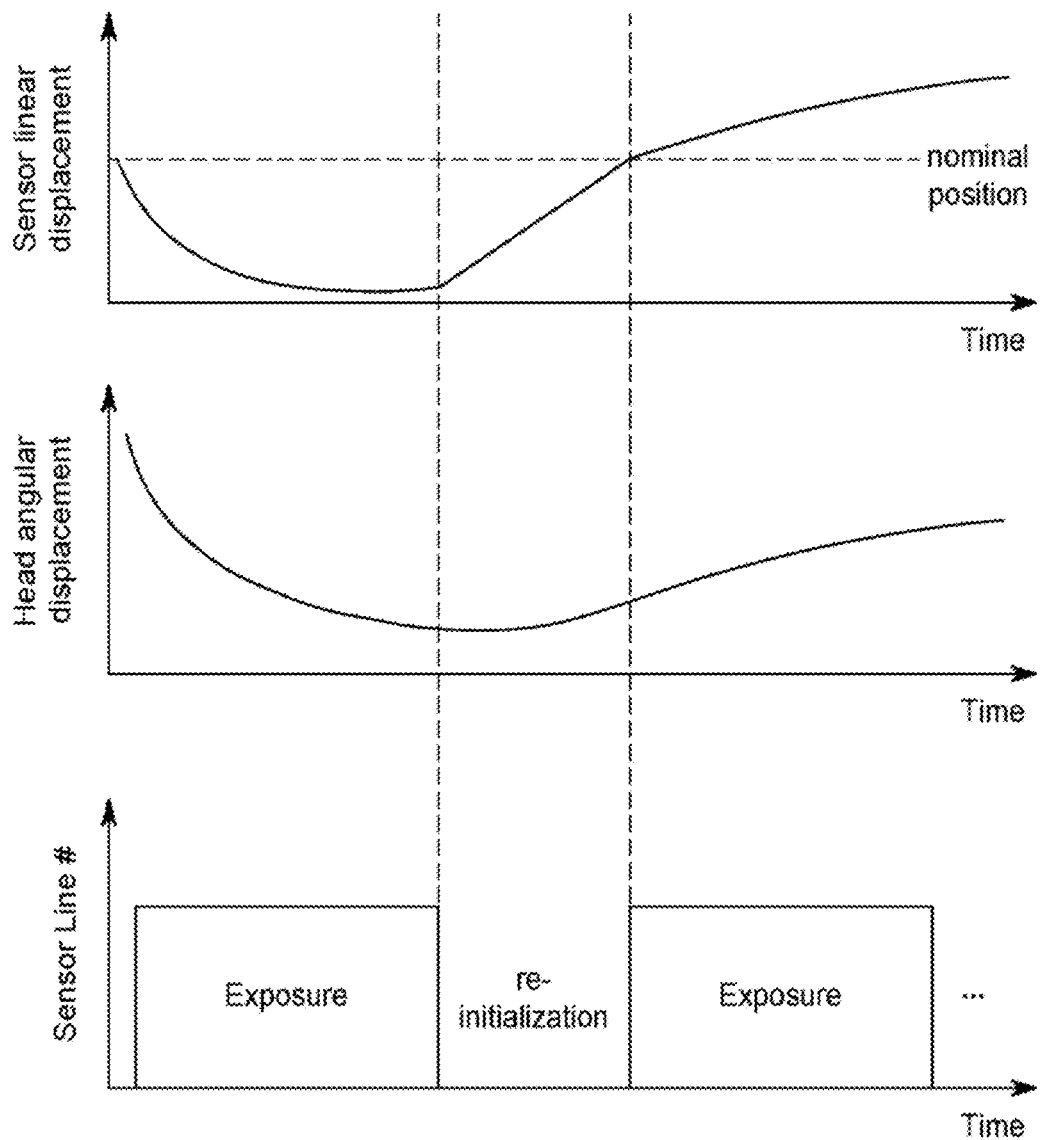
FIG. 7 illustrates alternation of image stabilization periods and re-initialization periods for a global shutter sensor.

FIG. 7 illustrates alternation of image stabilization periods and re-initialization periods for a global shutter sensor. In the case of a global shutter sensor, the OIS system stabilizes motion during the exposure of the frame and there should be a temporal gap long enough between the end of the exposure of the frame and the start of the exposure of the next frame to allow the stabilization component to move back to its nominal position.

Figure 8:
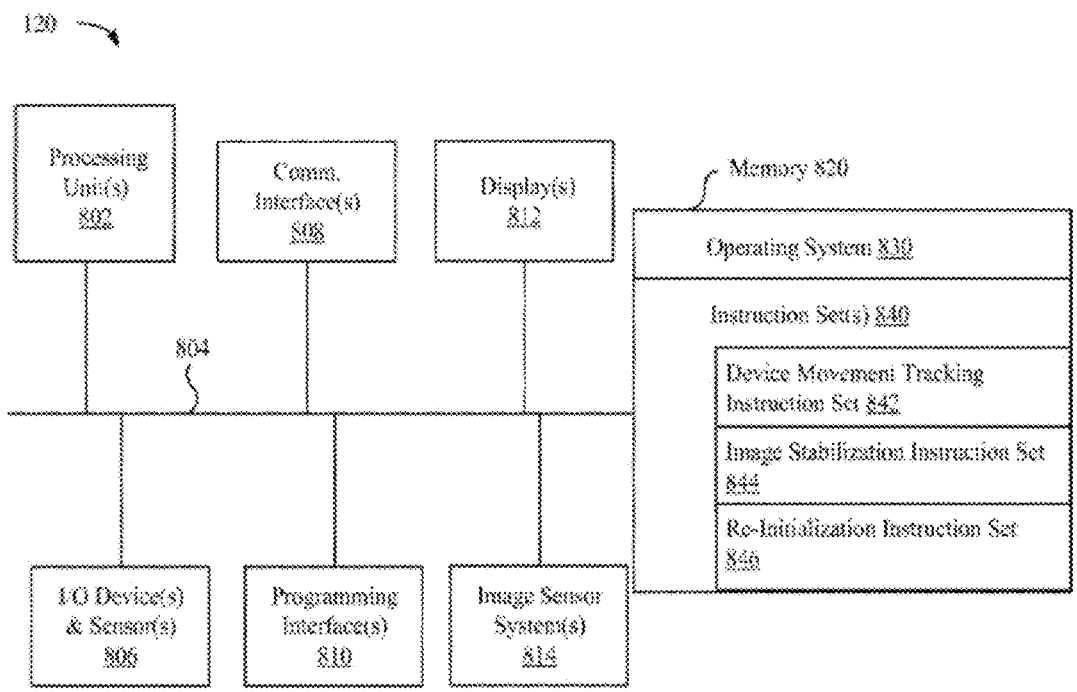
FIG. 8 illustrates an exemplary device configured in accordance with some implementations.

FIG. 8 is a block diagram illustrating exemplary components of the electronic device 120 configured in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 802 (e.g., DSPs, microprocessors, ASICS, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment (e.g. a 3D environment) to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the electronic device 120 includes a single display. In another example, the electronic device 120 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data. In various implementations, the one or more image sensor systems include an optical image stabilization (OIS) system configured to facilitate optical image stabilization according to one or more of the techniques disclosed herein.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 940 include a device movement tracking instruction set 942, an image stabilization instruction set 944, and a re-initialization instruction set 946. The instruction set(s) 940 may be embodied a single software executable or multiple software executables. In alternative implementations software is replaced by dedicated hardware, e.g., silicon.

In some implementations, the device movement tracking instruction set 942 is executable by the processing unit(s) 902 (e.g. a CPU) to track the rotation/panning and/or other movements of the electronic device 120 as described herein. To these ends, in various implementations, it includes instructions and/or logic therefor, and heuristics and metadata therefor.

In some implementations, the image stabilization instruction set 944 is executable by the processing unit(s) 902 (e.g., a CPU) to move one or more portion of the cameras of the electronic device 120 to provide image stabilization as described herein. To these ends, in various implementations, it includes instructions and/or logic therefor, and heuristics and metadata therefor.

In some implementations, the re-initialization instruction set 946 is executable by the processing unit(s) 902 (e.g., a CPU) to move one or more portion of the cameras of the electronic device 120 to prepare such components for subsequent image stabilization as described herein. To these ends, in various implementations, it includes instructions and/or logic therefor, and heuristics and metadata therefor.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at an electronic device comprising a processor, a motion sensor and a camera:
- detecting movement of the electronic device using the motion sensor while capturing video via the camera, the video comprising a plurality of frames, wherein the electronic device is a head mounted device (HMD) and the movement corresponds to a rotation of a head of a user;
- determining whether a gaze of the user is tracking something moving in a physical environment;
- when the gaze is not tracking something moving in the physical environment, providing image stabilization by:
  - during an exposure period of a frame of the frames, moving at least a portion of the camera from an initial position to a second position to compensate for the detected movement of the electronic device; and moving the portion of the camera from the second position to the initial position during a non-exposure period following the exposure period of the frame and prior to an exposure period of a subsequent frame; and when the gaze is tracking something moving in the physical environment, disabling image stabilization.

2. The method of claim 1, wherein the portion of a camera comprises an image sensor or imaging optics.

3. The method of claim 1 further comprising alternating:
image stabilization periods during which the portion of the camera is moved to compensate for detected movement of the electronic device; and
re-initialization periods during which the portion of the camera is returned to the initial position.

4. The method of claim 1, wherein moving the portion of the camera from initial position to the second position comprises a lateral shift or a rotation of an image sensor.

5. The method of claim 1, wherein moving the portion of the camera from initial position to the second position comprises a lateral shift or a rotation (e.g., tilt) of a lens barrel.

6. The method of claim 1, wherein the portion of the camera is moved via a linear actuator.

7. The method of claim 1, wherein the portion of the camera is moved via a digital signal processor (DSP).

8. The method of claim 1 further comprising selectively providing image stabilization during frame exposure periods, wherein image stabilization is disabled during a second exposure period based on determining that the movement corresponds to a gaze tracking a moving object in a physical environment.

9. The method of claim 1 further comprising providing the video for display on a display of the device as a live video feed.

10. The method of claim 9 further comprising providing image stabilization during frame exposure periods based on tracking gaze direction, wherein image stabilization is adjusted based on an amount of distortion in a region of the display corresponding to the gaze direction.

11. The method of claim 1 further comprising performing image stabilization based on camera distortion and eye tracking.

12. An electronic device comprising:
a camera comprising an image sensor and optics;
a two-dimensional (2D) linear actuator connected at least a portion of the camera to initiate linear movement of the image sensor or optics;
a motion sensor;
a display;
a non-transitory computer-readable storage medium; and
one or more processors coupled to the non-transitory computer-readable storage medium, wherein the non-transitory computer-readable storage medium comprises program instructions that, when executed on the one or more processors, cause the electronic device to perform operations comprising:
detecting movement of the electronic device using the motion sensor while capturing video via the camera, the video comprising a plurality of frames, wherein the electronic device is a head mounted device (HMD) and the movement corresponds to a rotation of a head of a user;

determining whether a gaze of the user is tracking something moving in a physical environment;
when the gaze is not tracking something moving in the physical environment, providing image stabilization by:
during an exposure period of a frame of the frames, moving at least a portion of the camera from an initial position to a second position to compensate for the detected movement of the electronic device; and
moving the portion of the camera from the second position to the initial position during a non-exposure period following the exposure period of the frame and prior to an exposure period of a subsequent frame; and
when the gaze is tracking something moving in the physical environment, disabling image stabilization.

13. The electronic device of claim 12, wherein the operations further comprise alternating:
image stabilization periods during which the portion of the camera is moved to compensate for detected movement of the electronic device; and
re-initialization periods during which the portion of the camera is returned to the initial position.

14. The electronic device of claim 12, wherein the 2D linear actuator comprises a voice coil motor (VCM) or comb drive micro-electro-mechanical system (MEMS) or piezoelectric motor.

15. The electronic device of claim 12, wherein the sensor is a gyroscope, inertial measurement unit (IMU), or image sensor.

16. The electronic device of claim 12, wherein the one or more processors comprise a digital signal processor (DSP).

17. The electronic device of claim 12, wherein the operations further comprise selectively providing image stabilization during frame exposure periods, wherein image stabilization is disabled during a second exposure period based on determining that the movement corresponds to a gaze tracking a moving object in the physical environment.

18. The electronic device of claim 12, wherein the display is configured to provide the video for display as a live video feed.

19. The electronic device of claim 12, wherein the operations further comprise providing image stabilization during frame exposure periods based on tracking gaze direction, wherein image stabilization is adjusted based on an amount of distortion in a region of the display corresponding to the gaze direction.

20. A non-transitory computer-readable storage medium, storing program instructions computer-executable on a computer to perform operations comprising:
detecting movement of the electronic device using the motion sensor while capturing video via the camera, the video comprising a plurality of frames, wherein the electronic device is a head mounted device (HMD) and the movement corresponds to a rotation of a head of a user;
determining whether a gaze of the user is tracking something moving in a physical environment;
when the gaze is not tracking something moving in the physical environment, providing image stabilization by:
during an exposure period of a frame of the frames, moving at least a portion of the camera from an initial position to a second position to compensate for the detected movement of the electronic device; and moving the portion of the camera from the second position to the initial position during a non-exposure period following the exposure period of the frame and prior to an exposure period of a subsequent frame; and
when the gaze is tracking something moving in the physical environment, disabling image stabilization.

* * * * *